July 22, 1969     S. B. NICOLL, JR     3,456,308
APPARATUS FOR THE MANUFACTURE OF CERAMIC PRODUCTS
Filed July 22, 1966     2 Sheets-Sheet 1
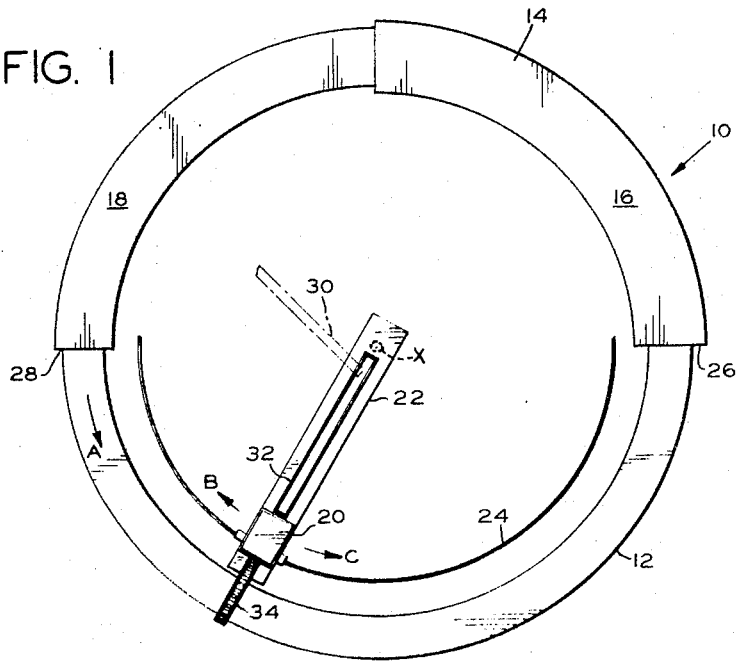
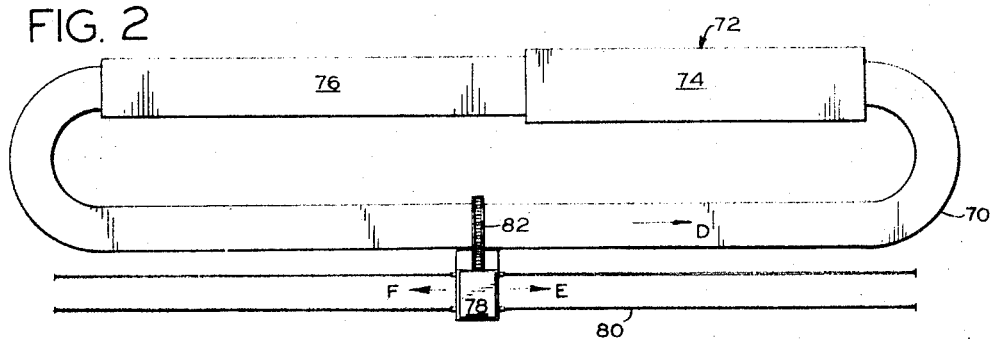
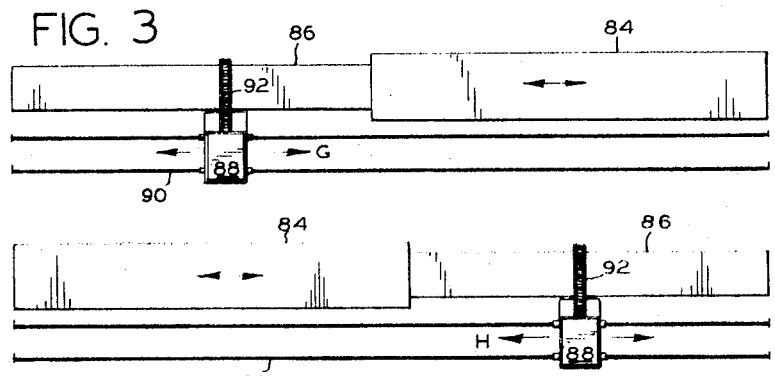
SIDNEY B. NICOLL, JR.
INVENTOR
BY
BUCKHORN, BLORE, KLARQUIST & SPARKMAN
ATTORNEYS

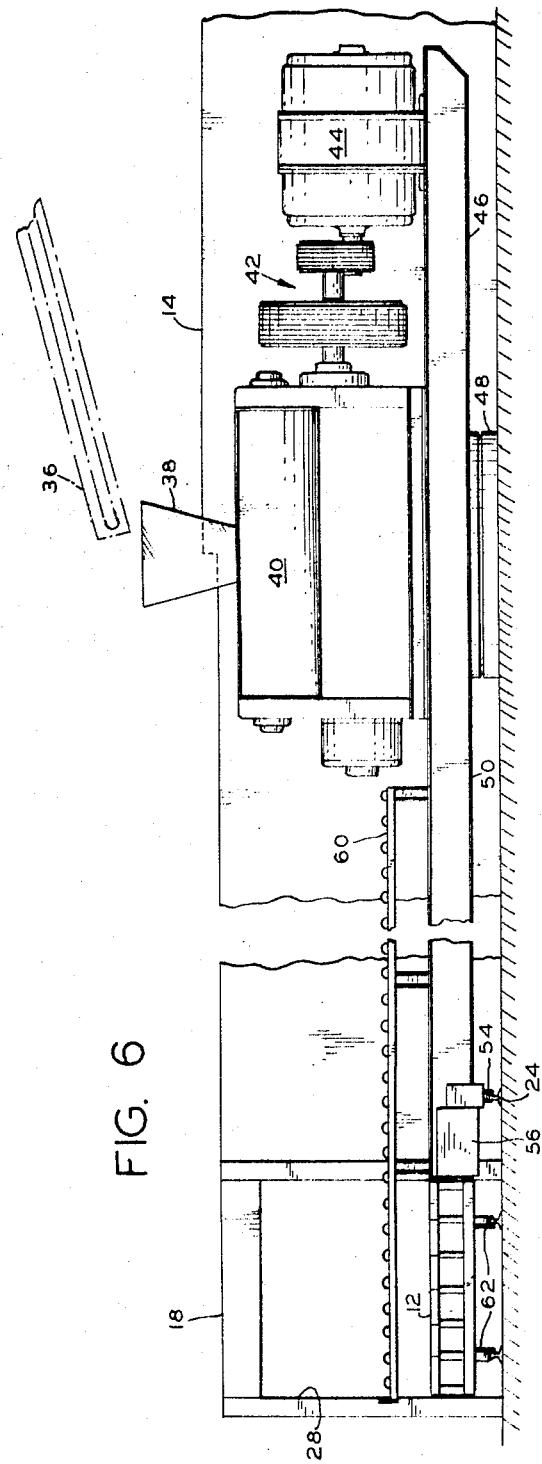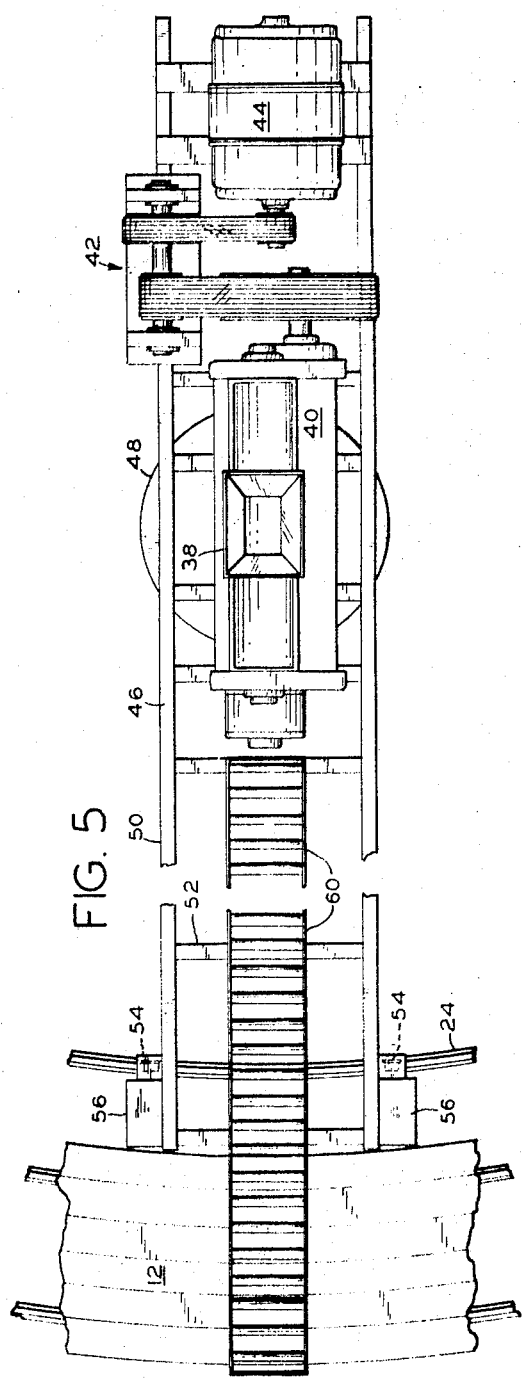

United States Patent Office 3,456,308
Patented July 22, 1969

3,456,308
APPARATUS FOR THE MANUFACTURE OF
CERAMIC PRODUCTS
Sidney B. Nicoll, Jr., 920 Story St.,
McMinnville, Oreg. 97128
Filed July 22, 1966, Ser. No. 567,125
Int. Cl. B28b 15/00
U.S. Cl. 25—2                    1 Claim

ABSTRACT OF THE DISCLOSURE

An apparatus for manufacturing ceramic products having a hearth and a kiln, at least one of which is movable with respect to the other, and a forming machine for forming the product prior to placement on the hearth. The forming machine is reciprocable and moves parallel to the hearth and the kiln while the ceramic goods are being formed. The method comprises forming ceramic products in a continuously moving forming machine, placing the products on a hearth while moving the forming machine relative to the hearth, and then inserting the ceramic products into a kiln to fire them. In the method the forming machine is moved parallel to the hearth while the ceramic products are being placed on the hearth. Movement of the forming machine is achieved either by rotating the forming machine about a central point in the plant or by linearly reciprocating the forming machine with respect to the hearth.

---

This invention relates to the manufacture of ceramic products and, more particularly, to an improved apparatus for and method of manufacturing ceramic products in which a movable ceramic forming machine is used to effect manufacturing economies.

In the usual ceramic manufacturing plant the products are made by stationary forming machines. They are then transported to hearth means for firing in a burning kiln. The hearth means may comprise a continuous hearth or it may take the form of a series of kiln cars, but in any event since the products are made in a forming machine which is located in a fixed position at some distance from the hearth means, a separate operation is required in order to transfer the products from the forming machine to the hearth means. This, of course, requires additional labor and time and results in increased costs to the manufacturer.

Accordingly, it is an object of the present invention to provide improved apparatus for the manufacture of ceramic products in which the forming machine used to form the ceramic products is movable relative to the hearth means and the kiln and is, in fact, moved while the ceramic products are being formed, so that said products can be placed on the hearth means either manually or automatically immediately subsequent to their formation.

It is a further object of the present invention to provide an improved apparatus for the manufacture of ceramic products in which the use of a movable forming machine will enable the manufacturer to save labor and thus attain increased manufacturing efficiencies and decreased manufacturing costs.

It is a still further object of the present invention to provide an improved method for the manufacture of ceramic products in which the formation of ceramic products by a continuously moving forming machine will save labor, improve efficiency and reduce manufacturing costs.

In accordance with these objects, I have provided an improved apparatus for manufacturing ceramic products which comprises a kiln for firing the ceramic products and hearth means on which the ceramic products can be placed for firing in said kiln. The hearth means may comprise either a continuous hearth or a series of individual kiln cars, as desired. The instant invention contemplates that either the hearth means or the kiln is movable with respect to the other, so that if the hearth means is stationary, the kiln is adapted to pass over the hearth for firing the goods, and if the kiln is stationary, the hearth means is adapted to pass into or through the kiln. A forming machine is provided for forming the ceramic products prior to their placement on the hearth means, and the forming machine is movable relative to the hearth means and the kiln while the ceramic goods are being formed. Specifically, the forming machine moves parallel to the hearth means while the ceramic goods are being formed. Thus, for example, during one eight hour shift the forming machine can load up the hearth means which then can continue moving through the kiln to fire the products during the rest of the 24 hour day. The forming machine may either be pivotal and reciprocable about a center point in the plant, or it may be linearly reciprocable with respect to the hearth means. The invention is not restricted to any particular type of forming machine, and such may desirably include dry presses, isostatic presses, extruders, casting machines and molding machines.

The method of my invention comprises forming the ceramic products in a continuously moving forming machine, placing the products on a hearth means while moving the forming machine relative to the hearth means, and then inserting the ceramic products into a burning kiln to fire the same. Specifically, the method contemplates moving the forming machine parallel to the hearth means while the ceramic products are being placed on the hearth means, either by rotating the forming machine about a central point in the plant, or by linearly reciprocating the forming machine with respect to the hearth means.

Other objects and advantages of the present invention will become apparent as the following description is read in connection with the accompanying drawings, in which:

FIG. 1 is a schematic plan view of a ceramic manufacturing plant in accordance with the present invention;

FIG. 2 is a schematic plan view of a ceramic manufacturing plant in accordance with another embodiment of the present invention;

FIG. 3 is a schematic plan view of a ceramic manufacturing plant in accordance with still another embodiment of the present invention;

FIG. 4 is a schematic plan view of the ceramic manufacturing plant of FIG. 3, illustrated in a different phase of its operation;

FIG. 5 is a detailed plan view of apparatus constructed for the schematic plant illustrated in FIG. 1; and FIG. 6 is a side elevational view of the apparatus illustrated in FIG. 5.

Referring to the drawings and particularly to FIGS. 1, 5 and 6, there is shown a ceramic manufacturing plant 10 made in accordance with the present invention. As such, the plant 10 comprises a continuous circular hearth 12 which rotates about its center point X to pass through a concentric circular kiln 14 having a pre-dry area 16 and a burning area 18, as shown. The continuous hearth 12 is adapted to rotate about the center point X in the direction of the arrow A.

A forming machine 20 for forming the ceramic products prior to their placement on the hearth 12 is mounted on a pivotable support boom 22 which is also adapted to rotate about the center point X and which is supported thereabove and also on a concentric monorail 24. In the schematic plant illustrated in FIG. 1, the forming machine 20 is shown located on the boom 22 approximately directly over the monorail 24, but of course, it should be understood that the machine 20 could occupy any position on the boom 22, depending only on its type and the type of product being made. The forming machine 20 may take the form of any of a variety of apparatus, including such machines as dry presses, isostatic presses, augers, extruders, casting machines or molding machines.

During the actual forming of the ceramic products, the machine 20 rotates about the center point X in the direction of the arrow B, and thus travels in a path that is parallel to the path of the hearth 12. Thus, newly formed ceramic products are first placed on the hearth 12 in the area opposite point 26 as the forming machine 20 travels in the direction of the arrow B. The hearth 12 meanwhile rotates in the direction of the arrow A to pass through the kiln 14, bringing the products first into the predry area 16 and then into the burning area 18, the burned ware finally emerging from the kiln at point 28. After the forming machine 20 has completed its clockwise travel (in the direction of the arrow B) such that it is opposite point 28, it is then rotated in the counter-clockwise direction (in the direction of the arrow C) until it reaches the other end of the monorail 24, opposite point 26, thereby to be in position to continue loading the hearth or otherwise to be coordinated with the movement and loading thereof.

As shown schematically in FIG. 1, the raw material for the forming machine 20 may be carried thereto by means of an overhead conveyor 30 and a conveyor belt 32, with the products of the machine being brought to the hearth 12 by another conveyor 34. The placement of the products on the hearth 12 may be either manual or by means of a placing machine. The speed of rotation of the boom 22 is controlled by a variable speed motor so as to coordinate its travel with the speed of the moving hearth 12 at the rate at which the products are formed by the machine 20.

FIGS. 5 and 6 illustrate details of a plant made in accordance with that shown in FIG. 1. Raw materials are brought by means of a conveyor 36 to a hopper 38 for feeding into an extruder 40 driven by a belt and pulley drive indicated generally by the numeral 42 and powered by a motor 44. In the embodiment illustrated in FIGS. 5 and 6, the extruder 40 is mounted on a boom 46, one end of which is supported by a turn-table 48 positioned at the center point X of the installation, the other end of the boom being movably supported on the monorail 24. The boom 46 is formed of two longitudinally extending I-beams 50 laterally joined together by cross-beams 52, as shown. The boom 46 is provided with railroad wheels 54 for traveling along the monorail 24 and the entire boom 46, extruder 40, motor 44 and other associated equipment mounted thereon is driven along the monorail 24 by a variable speed drive motor 56 mounted underneath the boom adjacent its end. A conveyor 60 transports the product from the extruder 40 to the hearth 12, which is itself mounted on wheels 62 which travel on rails 64.

FIG. 2 illustrates schematically another embodiment of a ceramic manufacturing plant made in accordance with the present invention, wherein a continuously moving hearth 70 rotates in the direction of the arrow D through a kiln 72 comprising a pre-dry area 74 and a burning area 76. A forming machine 78 mounted on rails 80 is adapted to reciprocate and move parallel to the hearth 70 while the ceramic products are being formed and placed on the hearth 70 after being transported thereto by a conveyor 82. Thus, the forming machine 78 is first moved in the direction of the arrow E to the right hand end of the rails 80. Products are made on the machine and placed on the continuously moving hearth 70 as the forming machine 78 moves in the direction of the arrow F and this process continues until the machine 78 reaches the left hand end of the rails 80. The products are made while the forming machine 78 is continuously moving and the products are placed on the hearth 70 as the forming machine 78 moves in the direction of the arrow F towards the left-hand end of the rails 80, the hearth meanwhile rotating through the kiln 72 in the direction of the arrow D. A variable speed drive motor (not shown) on the carrier for the forming machine 78 makes it possible to coordinate the loading of the products with the speed of the continuously moving hearth 70.

FIGS. 3 and 4 illustrate schematically still another ceramic plant made in accordance with the present invention in which a periodic or envelope kiln 84 is adapted to be moved over ceramic products after they have been placed on a stationary hearth 86. A reciprocable forming machine 88 is shown mounted on rails 90. With the kiln shown in the position illustrated in FIG. 3, ceramic products are formed on the machine 88 and placed on the hearth 86 as the forming machine 88 moves in the direction of the arrow G from the extreme left-hand end of the rails 90 to a position approximating the center of the installation. The kiln 84 is then moved to the position shown in FIG. 4 for burning the ware, and the forming machine 88 is moved to the extreme right-hand end of the rails 90 where the process can be resumed with the machine 88 moving in the direction of the arrow H. A folding or retractable conveyor 92 is provided to bring the products from the forming machine 88 to the hearth 86. Thus, the forming machine 88 forms the ceramic products while it is continuously moving parallel to the hearth while the forming machine moves relative thereto, the products being deposited first on one side of the hearth 86 and then on the other.

It should be noted that in each of the embodiments illustrated and described herein, the conveyors 34 (FIG. 1), 82 (FIG. 2) and 92 (FIG. 3) are in each case folding or retractable so as not to interfere with the movement of the hearth or kiln. Where a placing or setting machine is used, such is also foldable or retractable.

The ceramic manufacturing plant above described and the method herein disclosed in which the products are formed in a continuously moving forming machine and then placed on a hearth while moving the forming machine relative thereto, will enable many economies to be effected in the manufacturing process. Specifically, much of the apparatus and labor now used to move the products from stationary forming machines to kiln cars and by means of kiln cars to the hearth can be eliminated. This will mean that much of the equipment now needed to handle, transfer and transport kiln cars can be eliminated or at least greatly reduced. Such obviously will speed production, save labor costs and increase the efficiency of the plant.

Having thus described my invention with respect to certain particular preferred embodiments, it should be understood that the specific details shown are merely illustrative and that the invention may be carried out in other ways without departing from the true spirit and scope of the following appended claim.

I claim:

1. Apparatus for the manufacture of ceramic products comprising
   a circular hearth means and kiln, said hearth means and said kiln having a common center,
      at least one of said hearth means and said kiln being movable with respect to the other such that ceramic products placed on said hearth means can enter the interior of said kiln to be fired therein,
   a concentric track disposed in parallel relation to said hearth means and said kiln and interior to the same,
   a forming machine for forming said ceramic products prior to their placement on said hearth means,
   a boom adapted to support said forming machine,
      one end of said boom being pivotally supported at said center,
      the other end of said boom being movably supported on said track, and
   means to move said other end of said boom along said track, whereby said forming machine can move relative to said hearth means and said kiln while said ceramic goods are being formed.

References Cited

UNITED STATES PATENTS

| | | | |
|---|---|---|---|
| 2,183,944 | 12/1939 | Salisbury. | |
| 2,399,664 | 5/1946 | Clark | 25—134 |
| 2,932,874 | 4/1960 | Ludwig et al. | 25—2 |
| 3,178,791 | 4/1965 | Dickson et al. | 25—2 |

J. SPENCER OVERHOLSER, Primary Examiner

JOHN S. BROWN, Assistant Examiner

U.S. Cl. X.R.

25—132; 264—57, 58